United States Patent
Chen et al.

(10) Patent No.: US 9,210,544 B2
(45) Date of Patent: Dec. 8, 2015

(54) TRACKING DEVICE AND TRACKING DEVICE CONTROL METHOD

(71) Applicant: AthenTek Incorporated, Taipei (TW)

(72) Inventors: Chun-Nan Chen, Taipei (TW); Kai Huang, Taipei (TW)

(73) Assignee: AthenTek Incorporated, Taipei (TW)

( * ) Notice: Subject to any disclaimer, the term of this patent is extended or adjusted under 35 U.S.C. 154(b) by 0 days.

(21) Appl. No.: 14/298,845

(22) Filed: Jun. 6, 2014

(65) Prior Publication Data
US 2015/0281890 A1 Oct. 1, 2015

Related U.S. Application Data

(60) Provisional application No. 61/970,764, filed on Mar. 26, 2014.

(51) Int. Cl.
*H04W 24/00* (2009.01)
*H04W 4/02* (2009.01)
*H04W 4/00* (2009.01)

(52) U.S. Cl.
CPC .............. *H04W 4/021* (2013.01); *H04W 4/008* (2013.01)

(58) Field of Classification Search
USPC .................... 455/456.1; 340/539.13; 342/450
See application file for complete search history.

(56) References Cited

U.S. PATENT DOCUMENTS

| | | | |
|---|---|---|---|
| 2008/0143604 A1* | 6/2008 | Mock et al. | 342/450 |
| 2013/0099920 A1* | 4/2013 | Song et al. | 340/539.13 |
| 2014/0062695 A1* | 3/2014 | Rosen et al. | 340/539.13 |
| 2015/0119070 A1* | 4/2015 | Harris et al. | 455/456.1 |

* cited by examiner

*Primary Examiner* — Nathan Taylor

(57) ABSTRACT

A tracking device and a tracking device control method with intelligent safe zones are provided. The tracking device includes a positioning module, a long-range transceiver, a short-range transceiver and a microcontroller. The microcontroller is configured to provide the long-range transceiver with radio-signal information about a short-range radio signal received by the short-range transceiver. The long-range transceiver transmits the radio-signal information to a server for safe-zone identification of the tracking device and then receives a safe-zone identification result from the server. The microcontroller is further configured to operate the positioning module, the long-range transceiver and the short-range transceiver in accordance with the safe-zone identification result.

21 Claims, 9 Drawing Sheets

TRACKING DEVICE AND TRACKING DEVICE CONTROL METHOD

CROSS REFERENCE TO RELATED APPLICATIONS

This application claims the benefit of U.S. Provisional Application No. 61/970,764 filed on Mar. 26, 2014, the entirety of which is incorporated by reference herein.

BACKGROUND OF THE INVENTION

1. Field of the Invention

The present invention relates to a tracking device of a tracking system and it particularly relates to a tracking-device control method.

2. Description of the Related Art

A tracking system is used for the observing of persons or objects on the move and supplying a timely ordered sequence of respective location data to a model. A tracking system may employ a tracking device that is applied to the person or object being tracked and transmits an alarm and message including the person's or object's location when they leave a safe zone as defined by geo-fencing or a specially designed wireless beacon.

A geo-fence is a virtual perimeter around a predefined location or a predefined set of boundaries. Only stationary safe zones are built by geo-fencing. As for a safe zone defined by a specially designed wireless beacon, a burn-in process is required to register the specially designed wireless beacons to a memory (e.g. a ROM) of the tracking device.

BRIEF SUMMARY OF THE INVENTION

A tracking device and a tracking-device control method with intelligent safe zones are disclosed.

A tracking device in accordance with an exemplary embodiment of the disclosure includes: a positioning module for satellite navigation; a long-range transceiver for digital cellular communication; a short-range transceiver for radio-signal communication within a shorter range in comparison with the digital cellular communication; and a microcontroller. The microcontroller is configured to provide the long-range transceiver with radio-signal information about a short-range radio signal received by the short-range transceiver. The long-range transceiver transmits the radio-signal information to a server for safe-zone identification of the tracking device and then receives a safe-zone identification result from the server. The microcontroller is further configured to operate the positioning module, the long-range transceiver and the short-range transceiver in accordance with the safe-zone identification result.

The user of the tracking device may operate a personal computing device to upload information about the authenticated short-range radio sources of the tracking device to the server through the internet. The authenticated short-range radio sources may be a paired tracking device corresponding to the tracking device, a portable wireless device, or a stationary wireless device.

In another exemplary embodiment, a tracking-device control method is disclosed, including the following steps: providing a server for a tracking device, wherein the tracking device comprises a positioning module for satellite navigation, a long-range transceiver for digital cellular communication and a short-range transceiver for radio-signal communication within a shorter range in comparison with the digital cellular communication; providing the long-range transceiver with radio-signal information about a short-range radio signal received by the short-range transceiver and using the long-range transceiver to transmit the radio-signal information to the server for safe-zone identification of the tracking device, wherein the server generates a safe-zone identification result which is returned to the tracking device and received by the long-range transceiver; and operating the positioning module, the long-range transceiver and the short-range transceiver in accordance with the safe-zone identification result.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
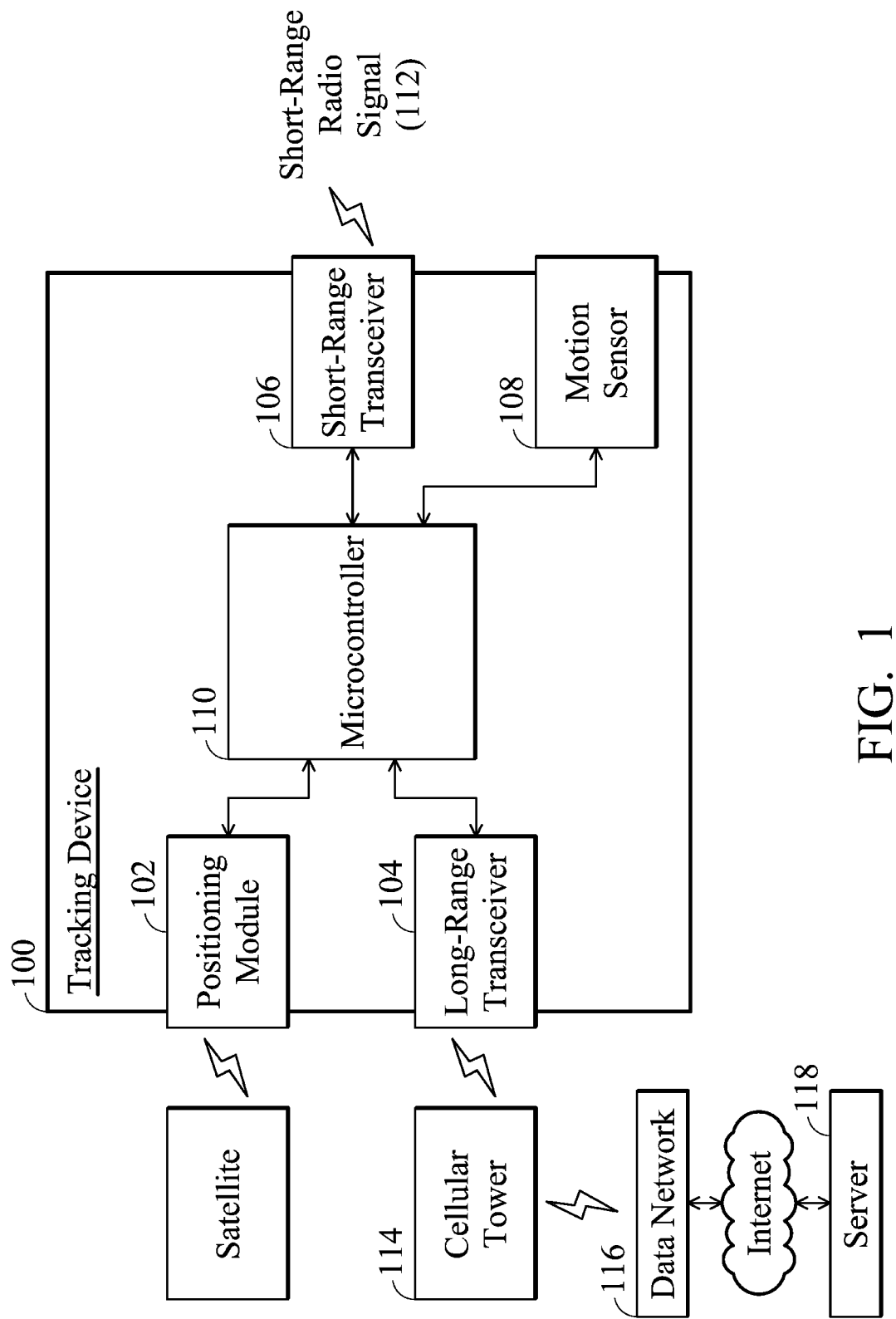
FIG. 1 is a block diagram depicting a tracking device 100 in accordance with an exemplary embodiment of the disclosure.

FIG. 1 is a block diagram depicting a tracking device 100 in accordance with an exemplary embodiment of the disclosure. The tracking device 100 may be a battery-powered device and includes a positioning module 102, a long-range transceiver 104, a short-range transceiver 106, a motion sensor 108 and a microcontroller 110. The positioning module 102, e.g. a GPS module, a GNSS (Global Navigation Satellite System) module and so on, is provided for satellite navigation. The long-range transceiver 104, e.g., a GSM transceiver, a 3G transceiver or any telecommunication transceiver, is provided for digital cellular communication. The short-range transceiver, e.g., Wi-Fi transceiver, BT transceiver, NFC transceiver, RFID transceiver and so on, is provided for radio-signal communication within a shorter range in comparison with the digital cellular communication. The motion sensor, e.g. a G-sensor, an accelerometer and so on, is provided for detecting the motion of the tracking device 100.

The microcontroller 110 is configured to provide the long-range transceiver 104 with radio-signal information about a short-range radio signal 112 received by the short-range transceiver 106. The radio-signal information may be a Media Access Control address (MAC address), a service identifier (SSID or ESSID), a Bluetooth device address (BD address), a device name, an RSSI (Received Signal Strength Indication) and so on. The long-range transceiver 104 transmits the radio-signal information to be received by a cellular tower 114 and then conveyed to a data network 116 and uploaded from the data networks 116 to a server 118 through the internet. Based on the radio-signal information about the short-range radio signal 112, the server 118 performs safe-zone identification for the tracking device 100 and thereby generates a safe-zone identification result. The safe-zone identification result is returned to the tracking device 100 and received by the long-range transceiver 104. The microcontroller 110 is further configured to operate the positioning module 102, the long-range transceiver 104, the short-range transceiver 106 or even the motion sensor 108 in accordance with the safe-zone identification result.

Figure 2:
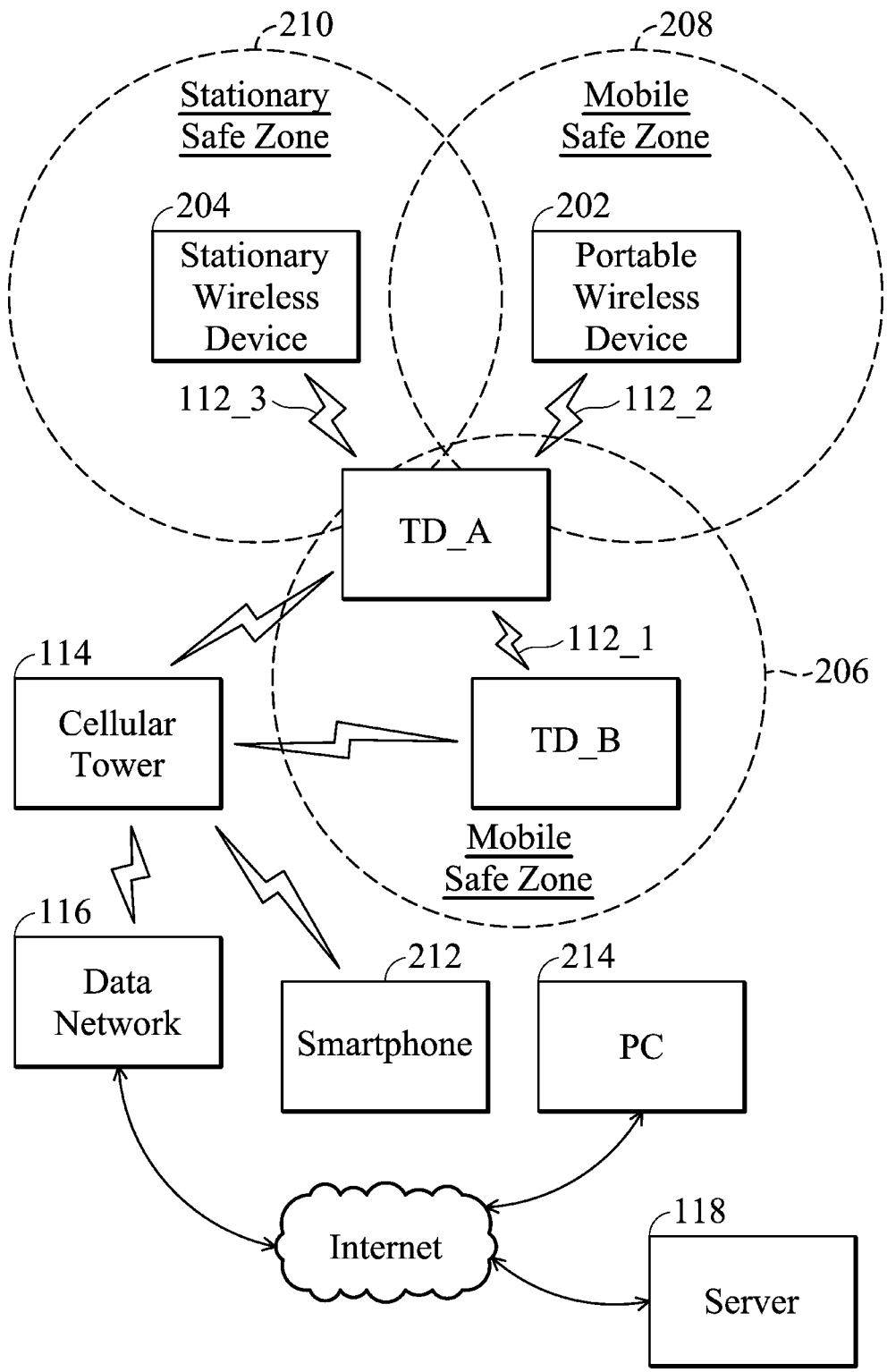
FIG. 2 depicts a communication system for intelligent safe-zone identification of a tracking device TD_A in accordance with an exemplary embodiment of the disclosure.

FIG. 2 depicts a communication system for intelligent safe-zone identification of a tracking device TD_A in accordance with an exemplary embodiment of the disclosure.

As shown, the authenticated short-range radio sources of the short-range radio signal for the tracking device TD_A may be a paired tracking device TD_B corresponding to the tracking device TD_A, a portable wireless device 202, or a stationary wireless device 204. A mobile safe zone 206 is defined around the paired tracking device TD_B. Within the mobile safe zone 206, the tracking device TD_A receives a stable short-range radio signal wireless signal 112_1 from the paired tracking device TD_B. A mobile safe zone 208 is defined around the portable wireless device. Within the mobile safe zone 208, the tracking device TD_A receives a stable short-range radio signal wireless signal 112_2 from the portable wireless device 202. A stationary mobile safe zone 210 is defined around the stationary wireless device 204. Within the stationary safe zone 210, the tracking device TD_A receives a stable short-range radio signal wireless signal 112_3 from the stationary wireless device 204.

The user of the tracking device TD_A may operate a personal computing device (a smartphone 212, a personal computer 214 and so on) to upload information about the authenticated short-range radio sources TD_B, 202 and 204 to the server 118 through the internet. In comparison with a conventional geo-fence (a virtual perimeter around a predefined location or a predefined set of boundaries), intelligent safe zones are determined according to the wireless environment around the tracking device TD_A. The authenticated short-range radio sources (e.g. TD_B, 202 and 204) in the wireless environment are registered in a database of the server 118 rather than registered in a ROM of the tracking device. In the present disclosure, it is convenient for the user to add or remove an authenticated short-range radio source for the tracking device TD_A.

Any tracking device capable of short-range radio transmission compatible with the short-range radio transceiver 106 of the tracking device TD_A may be grouped with the tracking device TD_A and registered in the database of the server 118 as the paired tracking device TD_B. Any portable electronic device capable of short-range radio transmission compatible with the short-range radio transceiver 106 of the tracking device TD_A may be registered in the database of the server 118 as the portable wireless device 202. Any stationary electronic device capable of short-range radio transmission compatible with the short-range radio transceiver 106 of the tracking device TD_A may be registered in the database of the server 118 as the stationary wireless device 204. The stationary wireless devices may be intelligent household electronic appliances with Bluetooth communication capability, a Wi-Fi AP, an NFC entrance system or an RFID door entry system and so on. In some exemplary embodiments, the electronic devices registered in the database of the server 118 as portable wireless devices may also contain a positioning module. For example, a smartphone with a GPS function may be registered in the database of the server 118 as an authenticated portable wireless device for the tracking device TD_A.

Figure 3:
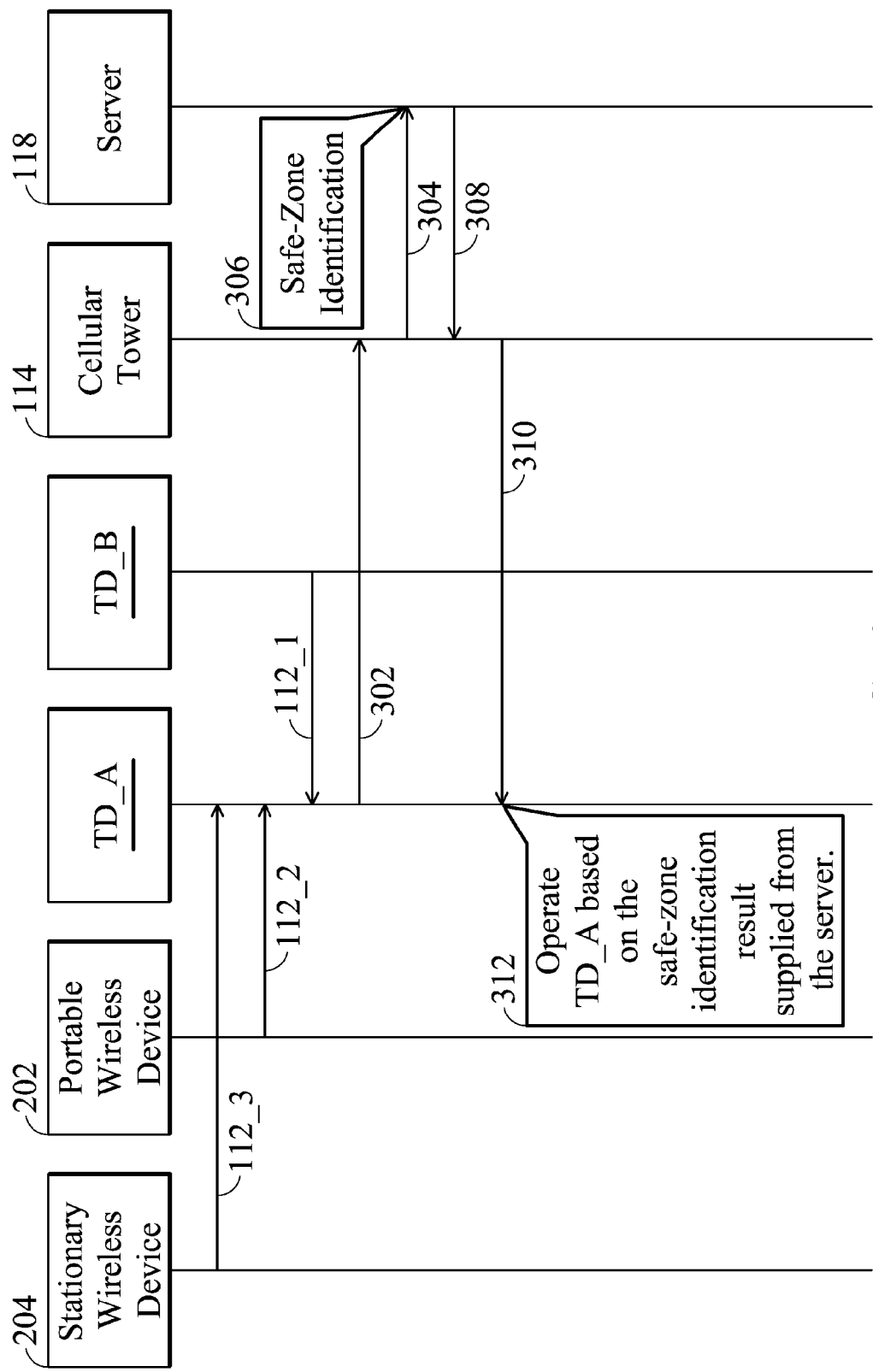
FIG. 3 is a call flow diagram for controlling the tracking device TD_A, wherein the tracking device TD_A receives radio signals 112_1, 112_2 and 112_3 from authenticated short-range radio sources TD_B, 202 and 204 and communicates with the server 118 through a cellular network.

FIG. 3 is a call flow diagram for controlling the tracking device TD_A, wherein the tracking device TD_A receives radio signals 112_1, 112_2 and 112_3 from authenticated short-range radio sources TD_B, 202 and 204 and communicates with the server 118 through a cellular network. The radio-signal information about the short-ranged radio signal 112_1, 1122 or 112_3 is transmitted from the tracking device TD_A to the cellular tower 114 (as indicated by arrow 302) and then conveyed to the server 118 (as indicated by arrow 304) for safe-zone identification 306. The safe-zone identification result is conveyed from the server 118 to the cellular tower 114 (as indicated by arrow 308) and then received by the tracking device TD_A (as indicated by arrow 310). As indicated by block 312, the tracking device TD_A operates in accordance with the safe-zone identification result supplied from the server 118.

Figure 4A:
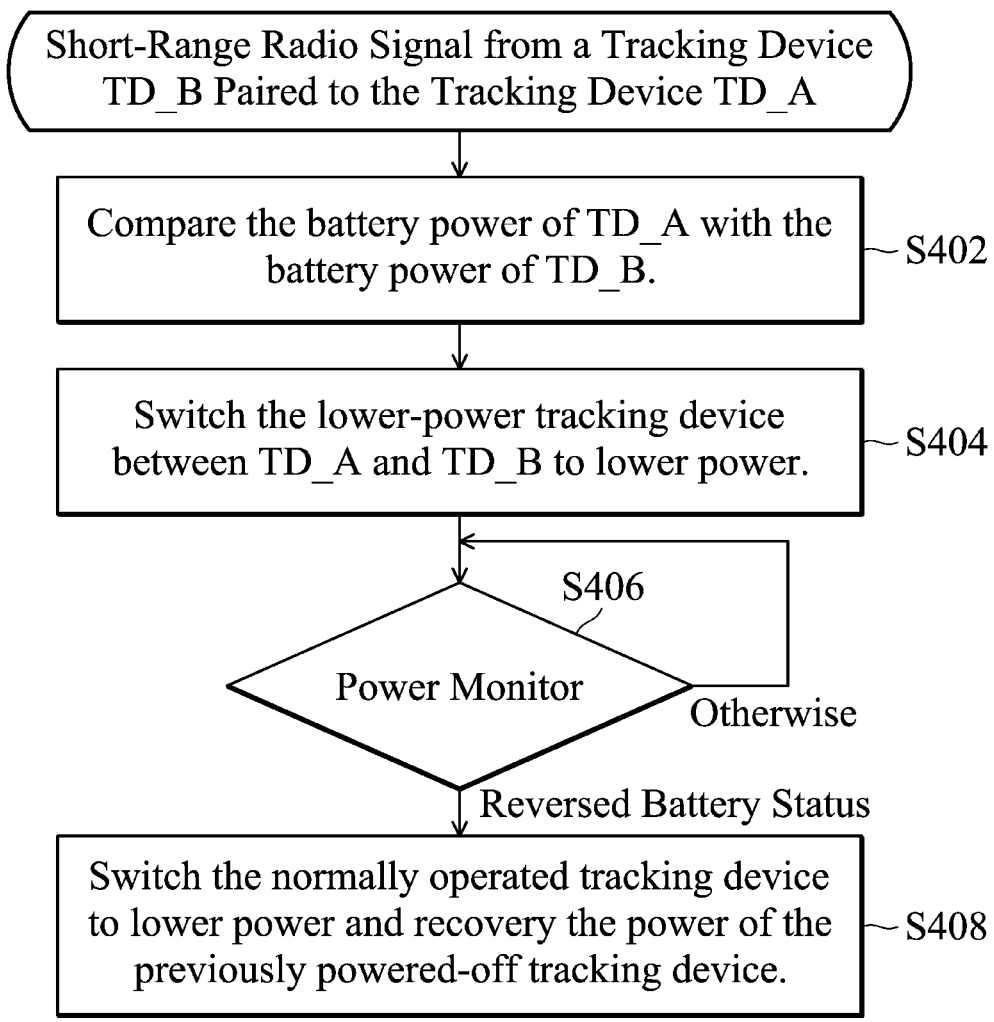
FIG. 4A is a flowchart depicting the battery power comparison process performed on the server 118 side.

Note that when the server 118 determines that the short-range radio signal received by the tracking device TD_A is provided from another tracking device registered in the database of the server 118 as a paired tracking device (TD_B) for the tracking device TD_A, the server 118 may further compare the battery power of the tracking device TD_A with the battery power of the tracking device TD_B. FIG. 4A is a flowchart depicting the battery power comparison process performed on the server 118 side. In step S402, the battery power of the tracking device TD_A is compared with the battery power of the paired tracking device TD_B and thereby a lower-power tracking device between the tracking device TD_A and the paired tracking device TD_B is determined. In step S404, the server 118 issues a request to switch the lower-power tracking device between the tracking device TD_A and the paired tracking device TD_B to lower power. For example, the lower-power tracking device may be powered off for power saving and regarded as being within a safe zone around the normally operated tracking device. In step S406, the server 118 repeatedly performs the battery power comparison to update the lower-power tracking device. When the battery power of the normally operated tracking device has been depleted to a point that is lower than the powered-off tracking device, step S408 is performed to switch the normally operated tracking device to lower power and recover the power of the previously powered-off tracking device. The tracking device currently powered off is regarded as being within a safe zone defined by the tracking device that is currently powered on.

Figure 4B:
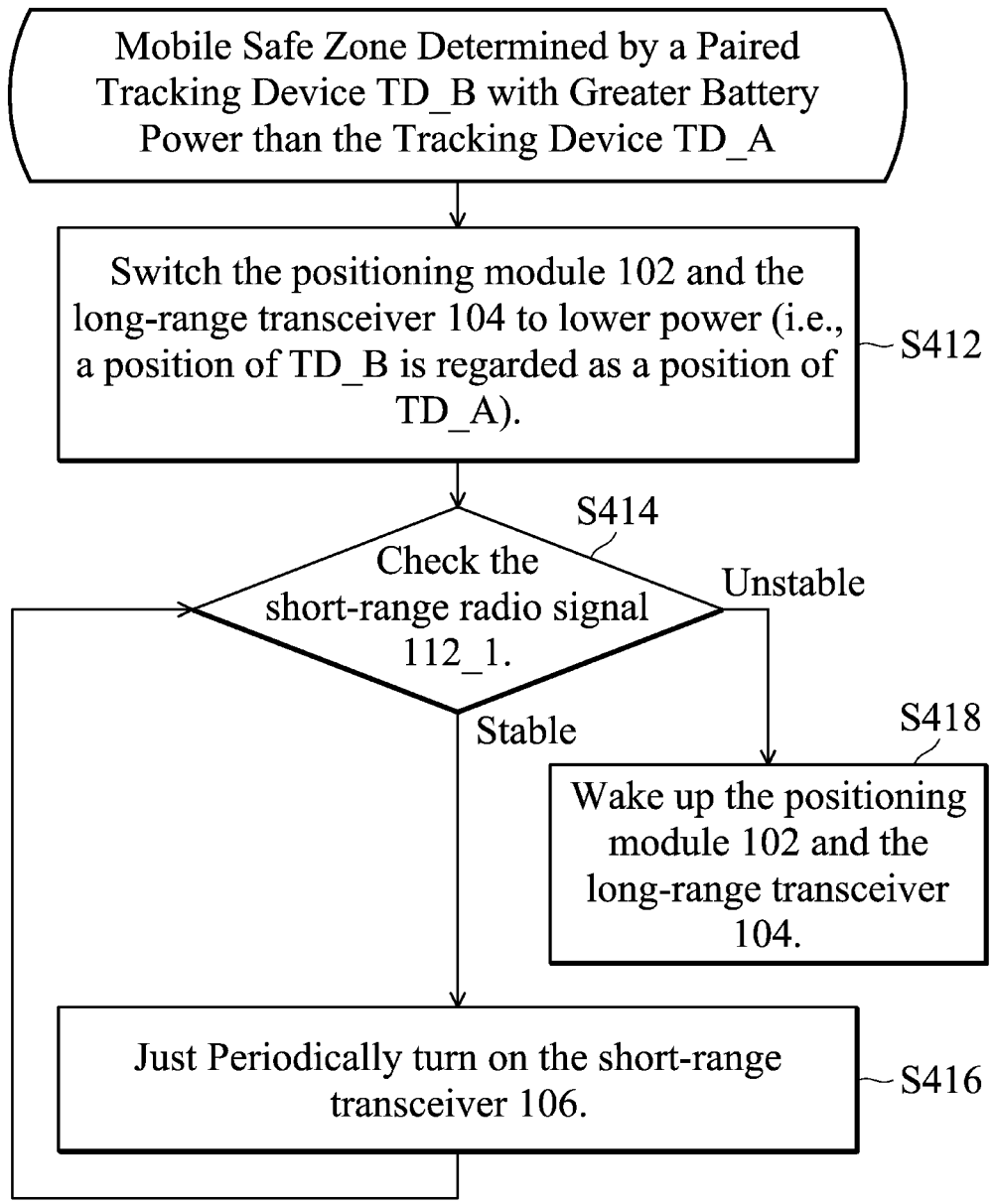
FIG. 4B is a flowchart depicting how the tracking device TD_A works when the safe-zone identification result received from the server 118 shows that the short-range radio signal 112_1 from the paired tracking device TD_B corresponding to the tracking device TD_A is received by the tracking device TD_A and the paired tracking device TD_B contains greater battery power than the tracking device TD_A.

FIG. 4B is a flowchart depicting how the tracking device TD_A works when the safe-zone identification result received from the server 118 shows that the short-range radio signal 112_1 from the paired tracking device TD_B corresponding to the tracking device TD_A is received by the tracking device TD_A and the paired tracking device TD_B contains greater battery power than the tracking device TD_A. In step S412, the microcontroller 110 of the tracking device TD_A is configured to switch the positioning module 102 and the long-range transceiver 104 to lower power (e.g., being powered off or just being switched to a sleep mode). The tracking device TD_A is regarded as being within the safe zone 206 defined by the paired tracking device TD_B. Note that the position of the paired tracking device TD_B is regarded as the position of the tracking device TD_A. In some embodiments, the long-range transceiver 104 is switched to lower power after the positioning module 102 has been switched to lower power. The stability of the short-range radio signal 112_1 is monitored in step S414. In step S416, the microcontroller 110 of the tracking device TD_A switches the short-range transceiver 106 to being just periodically turned on when the stability of the short-range radio signal 112_1 is reconfirmed. When it is determined that the short-range radio signal 112_1 is unstable, step S418 is performed, in which the positioning module 102 and the long-range transceiver 104 of the tracking device TD_A are woken up to update the position of the tracking device TD_A. The tracking device TD_A may further use the long-range transceiver 104 to transmit an alarm message to inform the user that the tracking device TD_A has left the safe zone 206 defined by the position of the paired tracking device TD_B.

Figure 5:
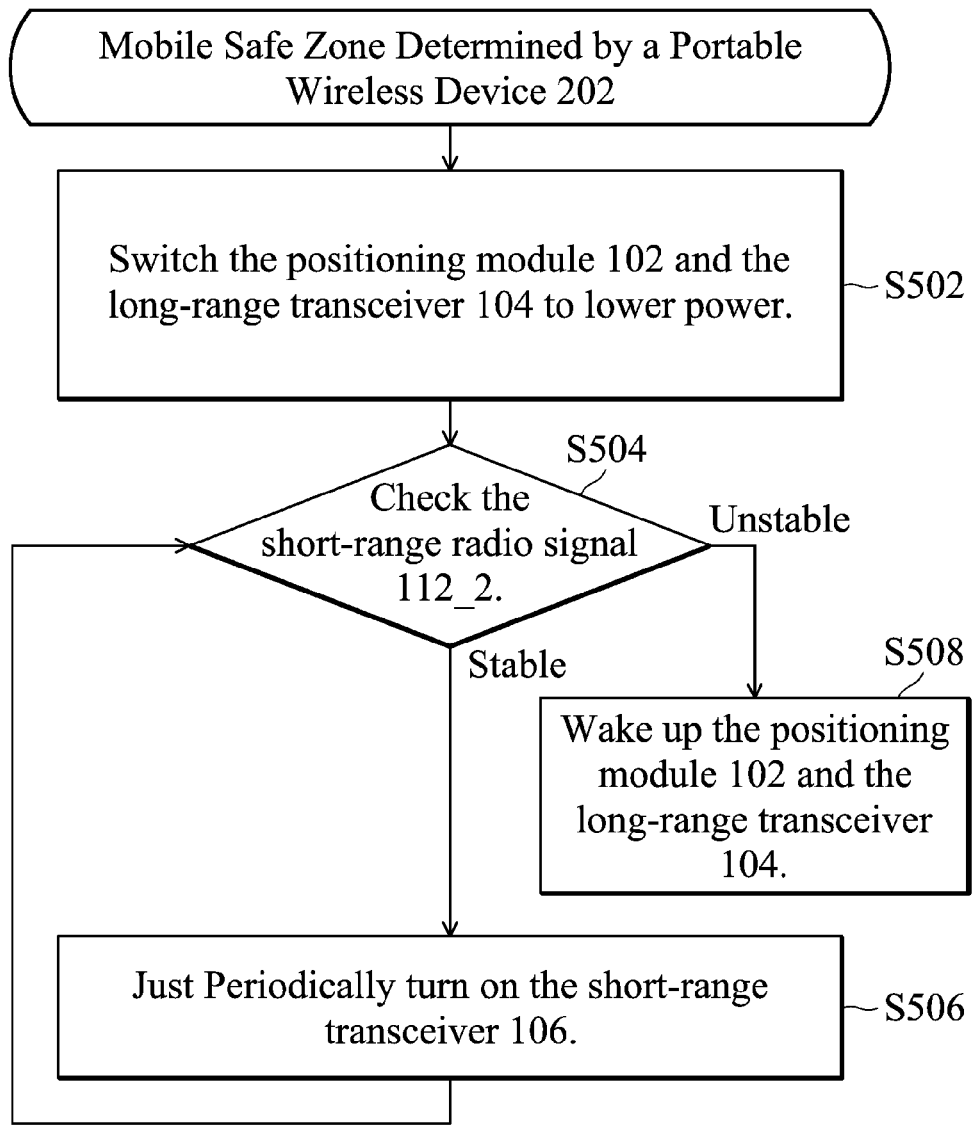
FIG. 5 is a flowchart depicting how the tracking device TD_A works when the safe-zone identification result received from the server 118 shows that the short-range radio signal 112_2 from a portable wireless device 202 listed in the database of the server 118 is received by the tracking device TD_A.

FIG. 5 is a flowchart depicting how the tracking device TD_A works when the safe-zone identification result received from the server 118 shows that the short-range radio signal 112_2 from a portable wireless device 202 listed in the database of the server 118 is received by the tracking device TD_A. In step S502, the microcontroller 110 of the tracking device TD_A is configured to switch the positioning module 102 and the long-range transceiver 104 to lower power (e.g., being powered off or just being switched to a sleep mode). The tracking device TD_A is regarded as being within the safe zone 208 defined by the portable wireless device 202. Note that, when the portable wireless device 202 also includes a positioning module and a long-range transceiver, the position of the portable wireless device 202 is regarded as the position of the tracking device TD_A. In some embodiments, the long-range transceiver 104 is switched to lower power after the positioning module 102 has been switched to lower power. The stability of the short-range radio signal 1122 is monitored in step S504. In step S506, the microcontroller 110 of the tracking device TD_A switches the short-range transceiver 106 to being just periodically turned on when the stability of the short-range radio signal 112_2 is reconfirmed. When it is determined that the short-range radio signal 1122 is unstable, step S508 is performed, in which the positioning module 102 and the long-range transceiver 104 of the tracking device TD_A are woken up to update the position of the tracking device TD_A. The tracking device TD_A may further uses the long-range transceiver 104 to transmit an alarm message to inform the user that the tracking device TD_A has left the safe zone 208 defined by the portable wireless device 202.

Figure 6:
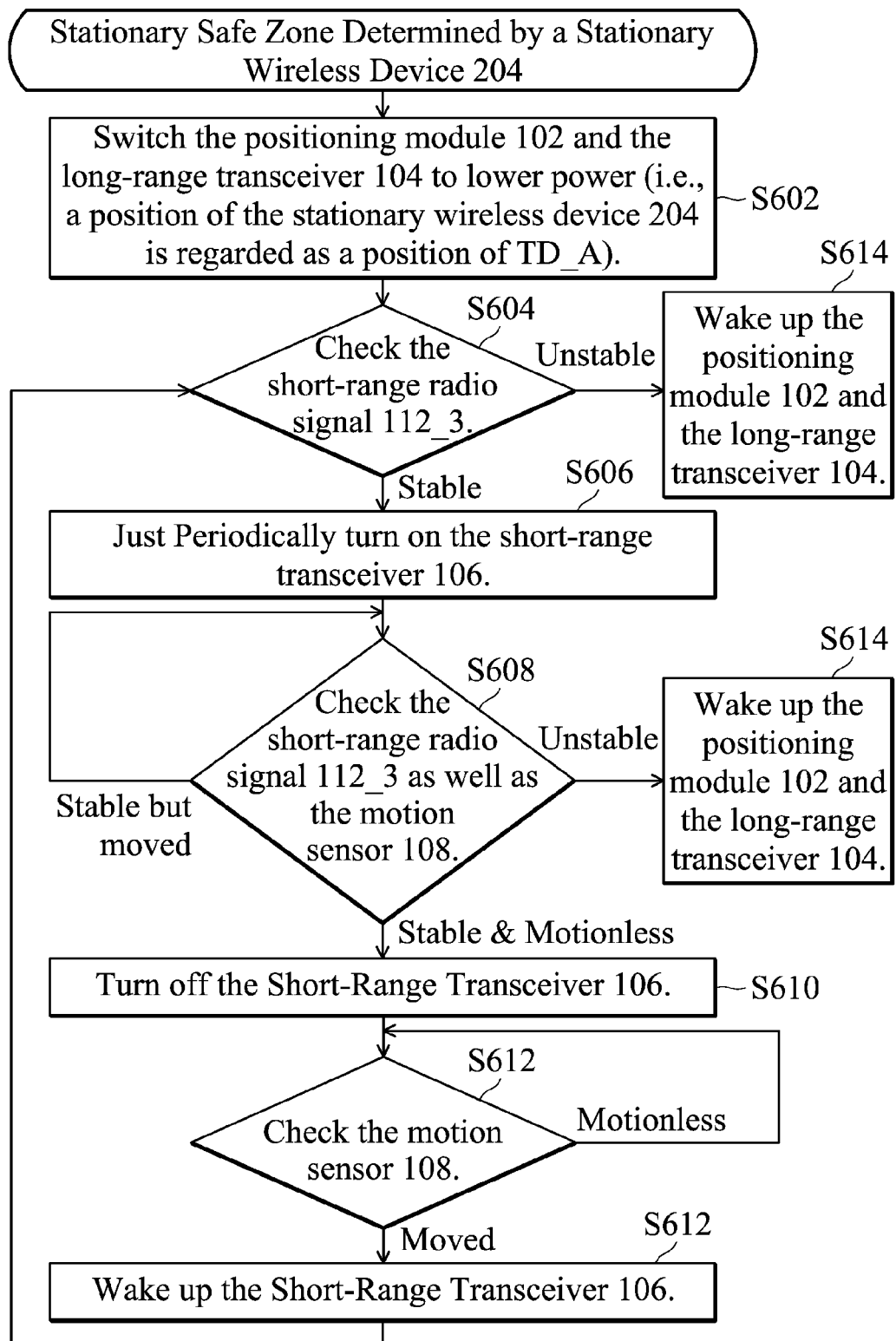
FIG. 6 is a flowchart depicting how the tracking device TD_A works when the safe-zone identification result received from the server 118 shows that the short-range radio signal 112_3 from the mobile wireless device 204 listed in the database of the server 118 is received by the tracking device TD_A.

FIG. 6 is a flowchart depicting how the tracking device TD_A works when the safe-zone identification result received from the server 118 shows that the short-range radio signal 112_3 from the mobile wireless device 204 listed in the database of the server 118 is received by the tracking device TD_A. In step S602, the microcontroller 110 of the tracking device TD_A is configured to switch the positioning module 102 and the long-range transceiver 104 to lower power (e.g., being powered off or just being switched to a sleep mode). The tracking device TD_A is regarded as being within the safe zone 210 defined by the stationary wireless device 204. Note that the position of the stationary wireless device 204 is regarded as the position of the tracking device TD_A. In some embodiments, the long-range transceiver 104 is switched to lower power after the positioning module 102 has been switched to lower power. The stability of the short-range radio signal 112_3 is monitored in step S604. In step S606, the microcontroller 110 of the tracking device TD_A switches the short-range transceiver 106 to being just periodically turned on when the stability of the short-range radio signal 112_3 is reconfirmed. In step S608, the motion sensor 108 of the tracking device TD_A is checked with the short-range radio signal 112_3. When the short-range radio signal 112_3 is stable and the motion sensor 108 shows that the tracking device TD_A is motionless, the microcontroller 110 further turns off the short-range transceiver 106 in step S610. As performed in step S612, the motion sensor 108 is monitored. When the motion sensor 108 detects movement of the tracking device TD_A, the microcontroller 110 wakes up the short-range transceiver 106 to check the short-range radio signal 112_3 in step S604. When it is determined that the short-range radio signal 112_3 is unstable, step S614 is performed, in which the positioning module 102 and the long-range transceiver 104 of the tracking device TD_A are woken up to update the position of the tracking device TD_A. The tracking device TD_A may further uses the long-range transceiver 104 to transmit an alarm message to inform the user that the tracking device TD_A has left the safe zone 210 defined by the stationary wireless device 204.

Figure 7A:
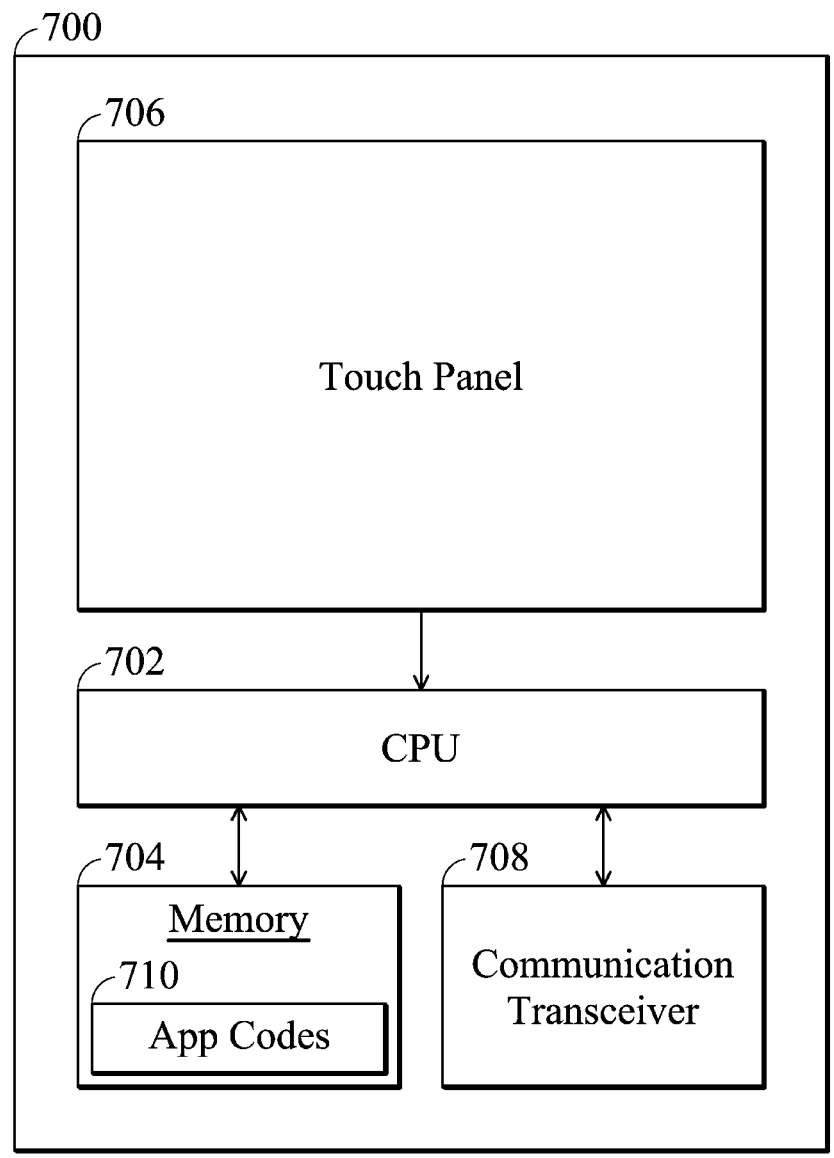
FIG. 7A shows a personal computing device 700 (e.g., the smartphone 212, the personal computer 214 and so on) for the user of the tracking device TD_A to enter information about authenticated short-range radio sources.

FIG. 7A shows a personal computing device 700 (e.g., the smartphone 212, the personal computer 214 and so on) for the user of the tracking device TD_A to enter information about authenticated short-range radio sources. The personal computing device 700 includes a central processing unit (CPU) 702, a memory 704, a touch panel 706 (or other I/O devices) and a communication transceiver 708. The application codes 710 stored in the memory 704 are executed by the CPU 702 to display a graphic user interface (GUI) on the touch panel 706 for the user to enter information about authenticated short-range radio sources. The CPU 702 operates the communication transceiver 708 to upload information about the authenticated short-range radio sources to the server 118 to build a database in the server 118 for the safe-zone identification of the tracking device TD_A.

Figure 7B:
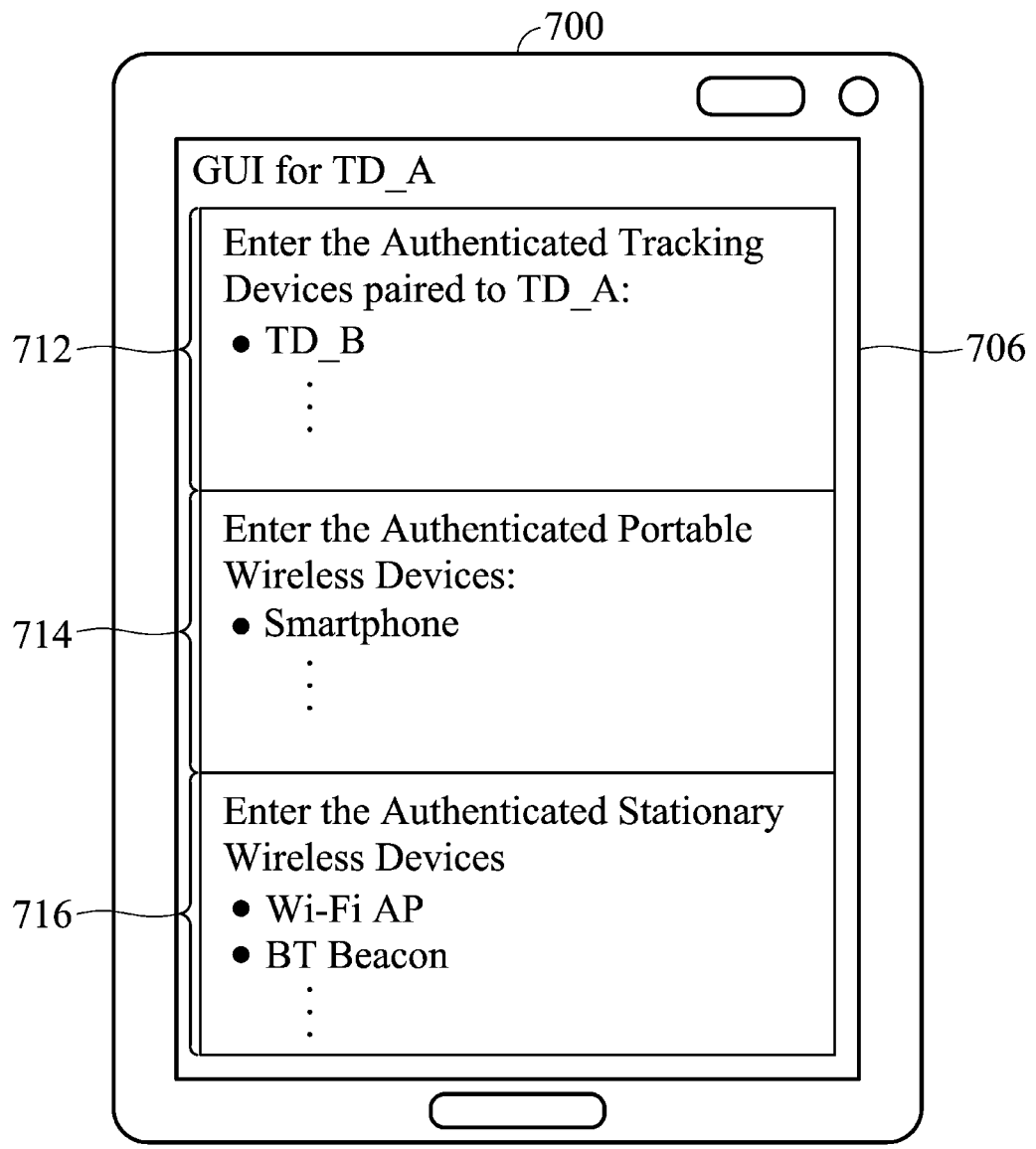
FIG. 7B illustrates a GUI displayed on the touch panel 706 in accordance with an exemplary embodiment of the disclosure.

FIG. 7B illustrates a GUI displayed on the touch panel 706 in accordance with an exemplary embodiment of the disclosure. As shown, the user may enter three kinds of authenticated short-range radio sources for building a database in the server 118, including the authenticated tracking devices paired to the tracking device TD_A (712), the authenticated portable wireless devices (714), and the authenticated stationary wireless devices (716).

In another exemplary embodiment, a tracking-device control method is disclosed, which is discussed with respect to FIG. 1. The tracking-device control method includes the following steps: providing a server 118 for a tracking device (100 or TD_A of FIG. 2); providing the long-range transceiver 104 of the tracking device with radio-signal information about a short-range radio signal 112 received by the short-range transceiver 106 of the tracking device and using the long-range transceiver 104 of the tracking device to transmit the radio-signal information to the server 108 for safe-zone identification of the tracking device, wherein the server 118 generates a safe-zone identification result which is returned to the tracking device and received by the long-range transceiver 104; and operating the positioning module 102, the long-range transceiver 104 and the short-range transceiver 106 in accordance with the safe-zone identification result.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A tracking device, comprising:
   a positioning module for satellite navigation;
   a long-range transceiver for digital cellular communication;
   a short-range transceiver for radio-signal communication within a shorter range in comparison with the digital cellular communication; and
   a microcontroller,
   wherein:
      the microcontroller is configured to provide the long-range transceiver with radio-signal information about a short-range radio signal received by the short-range transceiver, and the long-range transceiver transmits the radio-signal information to a server for safe-zone identification of the tracking device and receives a safe-zone identification result from the server;
      the microcontroller is further configured to operate the positioning module, the long-range transceiver and the short-range transceiver in accordance with the safe-zone identification result; and
      when the radio-signal information shows that the short-range radio signal is transmitted from a paired tracking device corresponding to the tracking device, the server performs a battery power comparison on the tracking device and the paired tracking device and switches a lower-power tracking device between the tracking device and the paired tracking device to lower power, the lower-power tracking device is regarded as being within a safe zone, and the server repeatedly performs the battery power comparison to update the lower-power tracking device.

2. The tracking device as claimed in claim 1, wherein:
   when the safe-zone identification result shows that the short-range radio signal is transmitted from the paired tracking device corresponding to the tracking device and containing greater battery power than the tracking device, the microcontroller switches the positioning module of the tracking device to lower power and a position of the paired tracking device is regarded as a position of the tracking device.

3. The tracking device as claimed in claim 2, wherein:
   the microcontroller further switches the long-range transceiver of the tracking device to lower power when switching the positioning module of the tracking device to lower power; and
   the microcontroller further switches the short-range transceiver of the tracking device to being just periodically turned on when stability of the short-range radio signal transmitted from the paired tracking device is reconfirmed.

4. The tracking device as claimed in claim 1, which is regarded as being within the safe zone when the server determines that the short-range radio signal received by the short-range transceiver is transmitted from a portable wireless device listed in a database of the server for the tracking device.

5. The tracking device as claimed in claim 1, wherein:
   when the safe-zone identification result shows that the short-range radio signal received by the short-range transceiver is transmitted from a portable wireless device listed in a database of the server for the tracking device, the microcontroller switches the positioning module to lower power.

6. The tracking device as claimed in claim 5, wherein:
   the microcontroller further switches the long-range transceiver to lower power when switching the positioning module to lower power; and
   the microcontroller further switches the short-range transceiver to being just periodically turned on when stability of the short-range radio signal transmitted from the portable wireless device is reconfirmed.

7. The tracking device as claimed in claim 1, which is regarded as being within the safe zone when the server determines that the short-range radio signal received by the short-range transceiver is transmitted from a stationary wireless device listed in a database of the server for the tracking device.

8. The tracking device as claimed in claim 1, wherein:
   when the safe-zone identification result shows that the short-range radio signal received by the short-range transceiver is transmitted from a stationary wireless device listed in a database of the server for the tracking device, the microcontroller switches the positioning module to lower power and a position of the stationary wireless device is regarded as a position of the tracking device.

9. The tracking device as claimed in claim 8, wherein:
   the microcontroller further switches the long-range transceiver to lower power when switching the positioning module to lower power; and
   the microcontroller further switches the short-range transceiver to being just periodically turned on when stability of the short-range radio signal transmitted from the stationary wireless device is reconfirmed.

10. The tracking device as claimed in claim 9, further comprising:
    a motion sensor,
    wherein:
       the microcontroller further turns off the short-range transceiver when the short-range radio signal transmitted from the stationary wireless device is stable and the motion sensor shows that the tracking device is motionless; and
       the microcontroller wakes up the short-range transceiver when the motion sensor detects movement of the tracking device.

11. A tracking-device control method, comprising:
    providing a server for a tracking device, wherein the tracking device comprises a positioning module for satellite navigation, a long-range transceiver for digital cellular communication and a short-range transceiver for radio signal communication within a shorter range in comparison with the digital cellular communication;
    providing the long-range transceiver with radio-signal information about a short-range radio signal received by the short-range transceiver and using the long-range transceiver to transmit the radio-signal information to the server for safe-zone identification of the tracking device, wherein the server generates a safe-zone identification result which is returned to the tracking device via the long-range transceiver; and operating the positioning module, the long-range transceiver and the short-range transceiver in accordance with the safe-zone identification result, wherein:

when the radio-signal information shows that the short-range radio signal is transmitted from a paired tracking device corresponding to the tracking device, the server performs a battery power comparison on the tracking device and the paired tracking device and switches a lower-power tracking device between the tracking device and the paired tracking device to lower power, the lower-power tracking device is regarded as being within a safe zone, and the server repeatedly performs the battery power comparison to update the lower-power tracking device.

12. The tracking-device control method as claimed in claim 11, wherein:

when the safe-zone identification result shows that the short-range radio signal is transmitted from the paired tracking device corresponding to the tracking device and containing greater battery power than the tracking device, the positioning module of the tracking device is switched to lower power and a position of the paired tracking device is regarded as a position of the tracking device.

13. The tracking-device control method as claimed in claim 12, further comprising:

switching the long-range transceiver of the tracking device to lower power when switching the positioning module of the tracking device to lower power; and switching the short-range transceiver of the tracking device to being just periodically turned on when stability of the short-range radio signal transmitted from the paired tracking device is reconfirmed.

14. The tracking-device control method as claimed in claim 11, wherein:

the tracking device is regarded as being within the safe zone when the server determines that the short-range radio signal received by the short-range transceiver is transmitted from a portable wireless device listed in a database of the server for the tracking device.

15. The tracking-device control method as claimed in claim 11, wherein:

when the safe-zone identification result shows that the short-range radio signal received by the short-range transceiver is transmitted from a portable wireless device listed in a database of the server for the tracking device, the positioning module is switched to lower power.

16. The tracking-device control method as claimed in claim 15, further comprising:

switching the long-range transceiver to lower power when switching the positioning module to lower power; and switching the short-range transceiver to being just periodically turned on when stability of the short-range radio signal transmitted from the portable wireless device is reconfirmed.

17. The tracking-device control method as claimed in claim 11, wherein:

the tracking device is regarded as being within the safe zone when the server determines that the short-range radio signal received by the short-range transceiver is transmitted from a stationary wireless device listed in a database of the server for the tracking device.

18. The tracking-device control method as claimed in claim 11, wherein:

when the safe-zone identification result shows that the short-range radio signal received by the short-range transceiver is transmitted from a stationary wireless device listed in a database of the server for the tracking device, the positioning module is switched to lower power and a position of the stationary wireless device is regarded as a position of the tracking device.

19. The tracking-device control method as claimed in claim 18, further comprising:

switching the long-range transceiver to lower power when switching the positioning module to lower power; and switching the short-range transceiver to being just periodically turned on when stability of the short-range radio signal transmitted from the stationary wireless device is reconfirmed.

20. The tracking-device control method as claimed in claim 19, further comprising:

providing a motion sensor in the tracking device;

turning off the short-range transceiver when the short-range radio signal transmitted from the stationary wireless device is stable and the motion sensor shows that the tracking device is motionless; and waking up the short-range transceiver when the motion sensor detects movement of the tracking device.

21. The tracking-device control method as claimed in claim 11, further comprising:

presenting a graphic user interface on a screen of a personal computing device for entering information about authenticated short-range radio sources of the short-range radio signal; and uploading the information about the authenticated short-range radio sources from the personal computing device to the server to build a database in the server for the safe-zone identification of the tracking device.

* * * * *